United States Patent [19]

Takegawa

[11] Patent Number: 5,245,858
[45] Date of Patent: Sep. 21, 1993

[54] METHOD OF MEASURING AIR-SPEED IN A REED GROOVE

[75] Inventor: Yujiro Takegawa, Uchinada, Japan

[73] Assignee: Tsudakoma Corporation, Ishikawa, Japan

[21] Appl. No.: 775,520

[22] Filed: Oct. 15, 1991

[30] Foreign Application Priority Data

Oct. 12, 1990 [JP] Japan .................................. 2-272135

[51] Int. Cl.$^5$ ............................................. G01B 13/22
[52] U.S. Cl. ..................................... 73/37.5; 139/1 B
[58] Field of Search ........................ 73/37.5, 104, 105; 139/1 A, 1 B

[56] References Cited

FOREIGN PATENT DOCUMENTS

| 3833687 | 4/1990 | Fed. Rep. of Germany ...... 139/1 B |
| 61-167063 | 7/1986 | Japan . |
| 61-174455 | 8/1986 | Japan . |
| 62-257443 | 11/1987 | Japan . |
| 1-239138 | 9/1989 | Japan . |
| 2-19544 | 1/1990 | Japan . |
| 2-160958 | 6/1990 | Japan . |

Primary Examiner—Hezron E. Williams
Assistant Examiner—Joseph W. Roskos
Attorney, Agent, or Firm—Wenderoth, Lind & Ponack

[57] ABSTRACT

Air is jetted into the reed groove of a modified reed in a manner equivalent to that in which air is jetted in practical weaving operation, air-speed is measured at a plurality of measuring points in the reed groove on each of a plurality of planes perpendicular to the longitudinal direction of the modified reed, a maximum air-speed among air-speeds at the measuring points in each plane is determined, and the positions of the measuring points respectively corresponding to the maximum air-speeds are provided in a visually recognizable state.

2 Claims, 6 Drawing Sheets

+ : MEASURING POINTS P $(x_i, y_j, z_k)$

✦ : STARTING MEASURING POINTS P $(x_i, y_j, z_k)$
✛ : TRIAL MEASURING POINTS p

METHOD OF MEASURING AIR-SPEED IN A REED GROOVE

BACKGROUND OF THE INVENTION

1. Field of the Invention

The present invention relates to a method of measuring air-speed in a reed groove formed in the modified reed of an air jet loom to find the condition of the modified reed. 2. Description of the Prior Art An air-speed distribution detector for detecting the distribution of air-speed on the modified reed of an air jet loom is disclosed in Japanese Laid-open Patent No. Sho 61-174455. The air-speed distribution detector has a plurality of pitot tubes distributed in the reed groove, and measures air-speed distribution by longitudinally shifting the pitot tubes in the reed groove.

The air-speed distribution detector measures merely the air-speed distribution in the reed groove. Therefore, the mode of flow of air in the reed groove cannot accurately be elucidated and hence information necessary for determining the condition of the modified reed is unavailable.

A device for determining the condition of a modified reed is disclosed in Japanese Laid-open Patent No. Hei 2-60958. This device measures air-speed on the back side of the modified reed to detect a position where a peak air-speed is measured with respect to the height of the modified reed.

Since this device measures the air-speed on the back side of the modified reed, the mode of flow of air in the reed groove is unknown. Since the mode of flow of air on the back side of the modified reed is affected by a slight irregularity in the shape of the dents, an irregularity in the surface roughness of the dents or by an irregular arrangement of the dents, the mode of flow of air on the back side of the modified reed does not reflect accurately the mode of flow of air in the reed groove. Accordingly, the condition of the modified reed cannot accurately be evaluated on the basis of the air flow on the back side of the modified reed.

SUMMARY OF THE INVENTION

Accordingly, it is an object of the present invention to enable the accurate determination of the condition of a modified reed by measuring an air-speed which is directly related to the condition of the modified reed at positions distributed longitudinally along the modified reed.

To achieve the object, the present invention jets air into the reed groove of a modified reed under conditions equivalent to weaving conditions, measures the air-speed with respect to the longitudinal direction of the reed groove at a plurality of measuring positions within the reed groove, determines a point where a maximum air-speed appears on a plane perpendicular to the longitudinal direction of the reed groove and including each measuring position, and provides arrangement of the points for visual recognition.

The plurality of measuring positions are determined successively by coordinates on a two-dimensional or three-dimensional coordinate system during the measurement of the air-speed or determined one by one by new coordinates on the basis of variation of measured values in determining a maximum air-speed. The modified reed is held fixedly on a measuring table or mounted on a loom before measuring the air-speed. A special nozzle for air-speed measurement capable of being moved along the longitudinal direction of the modified reed, a set of auxiliary nozzles on the loom or a set of nozzles fixed to the meauring table is used for air-speed measurement.

The present invention has the following characteristic advantages.

A point where a maximum air-speed appears can accurately be determined for each of a plurality of measuring positions longitudinally distributed in the reed groove of the modified reed. Accordingly, the mode of flow of air in the reed groove can accurately be determined and hence the condition of the modified reed can readily be found.

A maximum air-speed at each of plurality of the measuring positions longitudinally distributed in the reed groove is measured by a single air-speed measuring instrument. Accordingly, a maximum air-speed at the measuring position can accurately be measured. If a plurality of air-speed measuring instruments are provided respectively at the measuring positions according to a conventional air-speed measuring method, the air-speed can be measured only at limited number of measuring positions in the reed groove and hence it is difficult to measure the air-speed accurately over the entire region of the reed groove.

The maximum air-speed data is displayed for visual recognition in a two-dimensional or three-dimensional diagram. Accordingly, the mode of flow of air in the reed groove can accurately be recognized and the three-dimensional condition of the modified reed can readily be determined.

Since the air-speed is measured at the predetermined measuring positions, the air-speed measurement can be controlled by a simple program and can quickly be achieved, a maximum air-speed can quickly be determined, and the air-speed can be measured in the entire region of the reed grooove.

An air-speed measuring method that determines measuring positions according to the variation of air-speed is effective when the mode of variation of air-speed cannot be estimated. Accordingly, this method can be applied to inspecting a new reed. A necessary accuracy can be secured by determining the number of measuring positions and the small movement of the measuring positions.

DETAILED DESCRIPTION OF THE PREFERRED EMBODIMENTS

Figure 1:
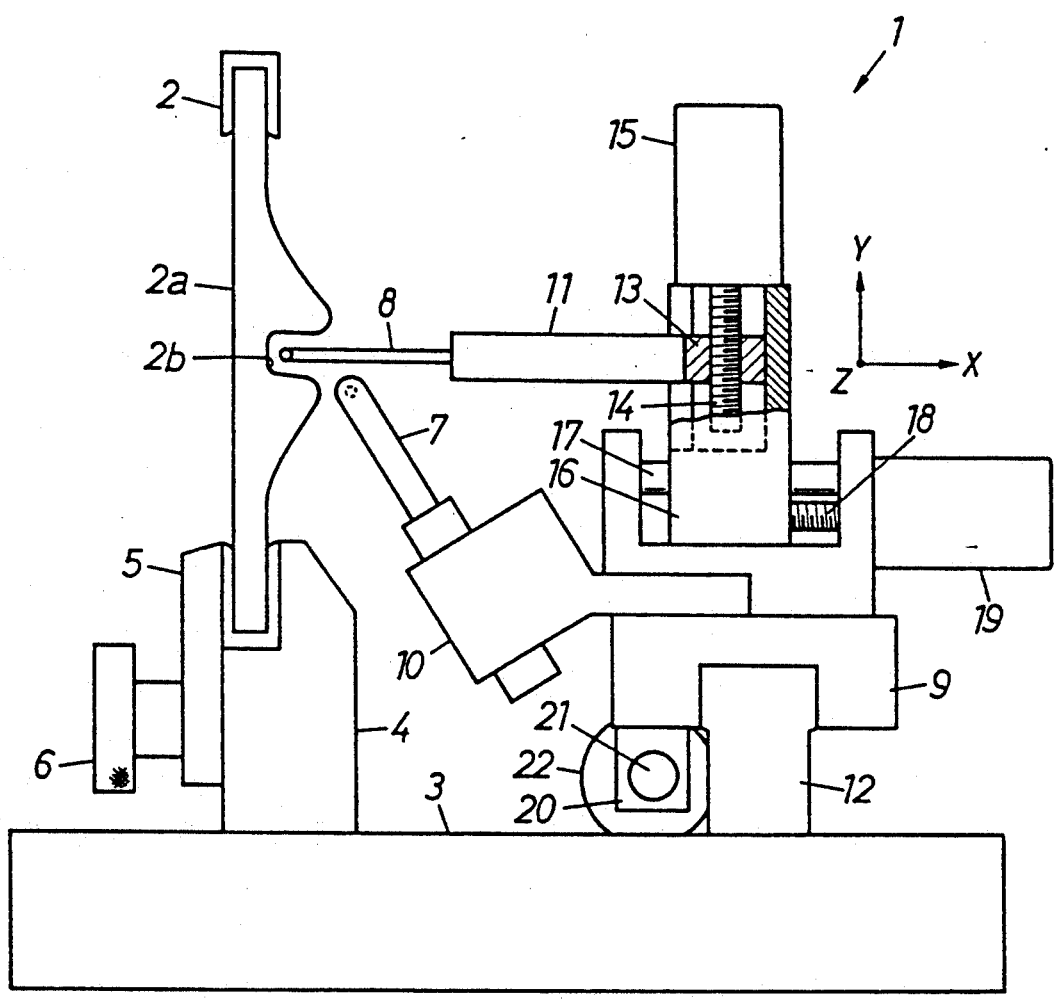
FIG. 1 is a front view of an air-speed measuring apparatus for carrying out an air-speed measuring method in accordance with the present invention.
Figure 2:
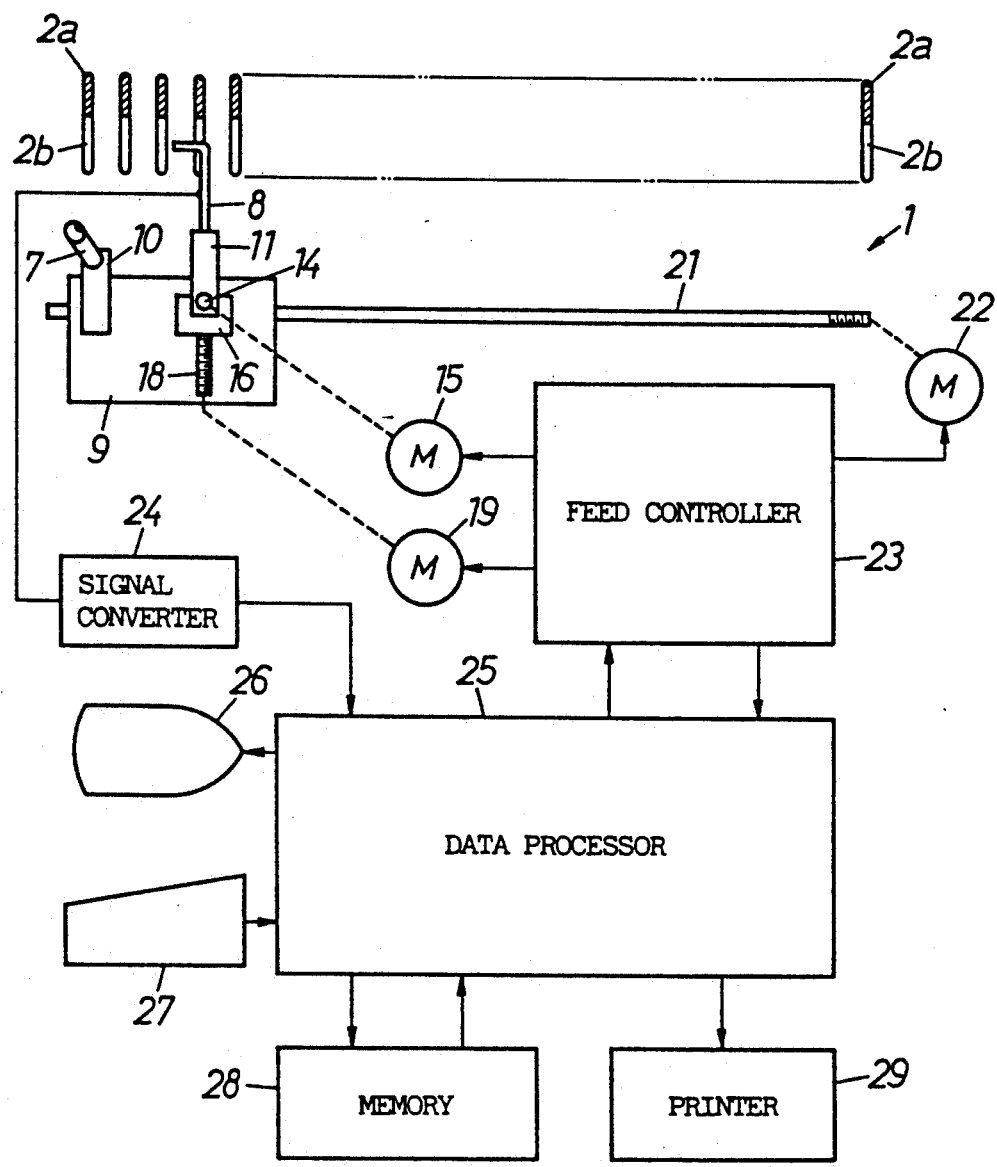
FIG. 2 is a block diagram of a control system incorporated into the air-speed measuring apparatus of FIG. 1.

FIGS. 1 and 2 show the mechanical construction of an air-speed measuring apparatus 1 and the electronic configuration of a control system incorporated into the air-speed measuring apparatus 1, respectively.

Referring to FIG. 1, a modified reed 2 is set in a horizontal position with its dents in an upright position in the groove of a holder 4 mounted on a horizontal measuring table 3 and is fastened in place with holding screws 6. A nozzle 7 and air-speed measuring instrument 8 are disposed opposite to the reed groove of the modified reed 2.

The nozzle 7 and the air-speed measuring instrument 8 are held respectively on brackets 10 and 11 supported on a feed table 9. The feed table 9 is able to slide along the Z-axis, namely, an axis parallel to the longitudinal direction of the modified reed 2, on a guide rail 12 extended on the table 3 in parallel to the modified reed 2. The feed table 9 is driven for sliding movement on the guide rail 12 together with the nozzle 7 and the air-speed measuring instrument 8 by a driving mechanism comprising a feed nut 20 fixed to the feed table 9 at a predtermined position, a screw shaft 21 engaging the feed nut 20 and extended in parallel to the guide rail 12, and a moter 22 for driving the screw shaft 21. A feed nut 13 fixed to rear end of the bracket 11 is fitted in a groove formed in a slider 16 so as to be moved along the Y-axis.

The positional condition of the nozzle 7 is equivalant to that of the auxiliary nozzle of a loom. The nozzle 7 jets air through its nozzle exit into a reed groove 2b conposed of the recess of each dent 2a of the modified reed 2 at an appropriate angle to or in parallel to a weft yarn passage.

The air-speed measuring instrument 8 is a pitot tube system or a hot-wire anemometer. The air-speed measuring instrument 8 is disposed a predetermined distance after the nozzle 7 with respect to the direction of flow of air with its detecting head positioned in the reed groove 2b. The air-speed measuring instrument 8 can be moved along the Y-axis by the cooperative action of the feed nut 13 fixed to the bracket 11, a screw shaft 14 extended in parallel to the Y-axis and engaging the feed nut 13, and a motor 15 for driving the screw shaft 14 for rotation. The slider 16 can be moved along a horizontal guide rod 17 fixedly extended along the X-axis on the feed table 9 by the cooperative action of a screw shaft 18 engaging an internal thread formed in the slider 16, and a motor 19 for driving the screw shaft 18 to move the detecting head of the air-speed measuring instrument 8 along the X-axis within the reed groove 2b.

Referring to FIG. 2, the air-speed measuring instrument 8 is connected through a signal converter 24 to the input of a data processor 25. A measured data processing program and a control program for controlling the air-speed measuring instrument 8 are stored in the data processor 25. A feed controller 23 for controlling the operation of the motors 15, 19 and 22, a display 26, a keyboard 27, and a memory 28 and a printer 29 are connected to the data processor 25.

An air-speed measuring method in a first embodiment according to the present invention is described below with reference to FIGS. 3,4 and 5. A plurality of measuring points P are previously set in the reed groove 2b on the plane (XY-plane) perpendicular to the longitudinal direction of the reed groove 26 to determine the position (x, y) representing a maximum air-speed Va for each plane from all the air-speed data at the measuring points P.

Figure 3:
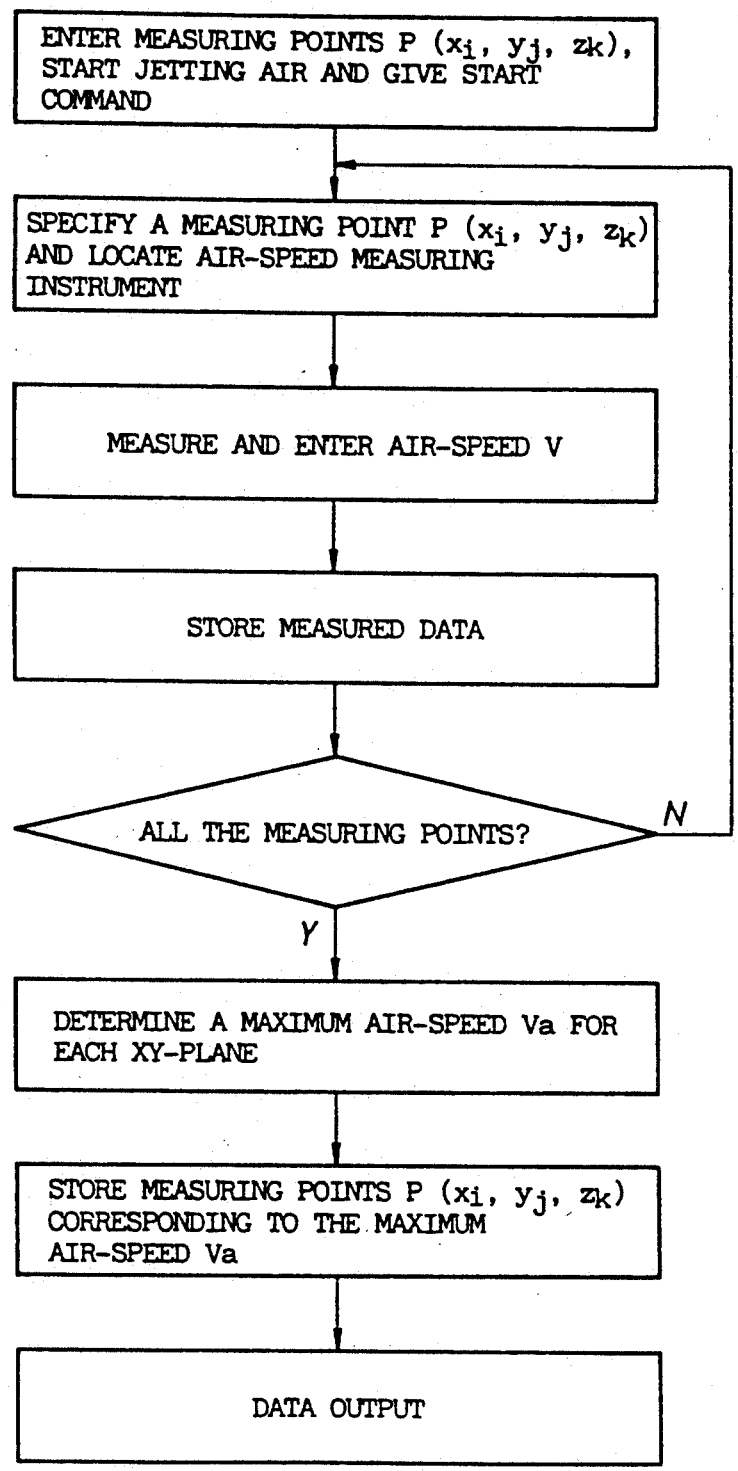
FIG. 3 is a flowchart of an air-speed measuring program to be carried out by an air-speed measuring method in a first embodiment according to the present invention.

Referring to FIG. 3, the keyboard 27 is operated in a first step 1 to store the three-dimensional coordinates $(x_i, y_j, z_k)$ of the measuring points P in the memory 28, compressed air of a pressure equal to that of compressed air supplied for actual weaving operation is supplied to the nozzle 7, and then a start command is given to the data processor 25.

Figure 4:
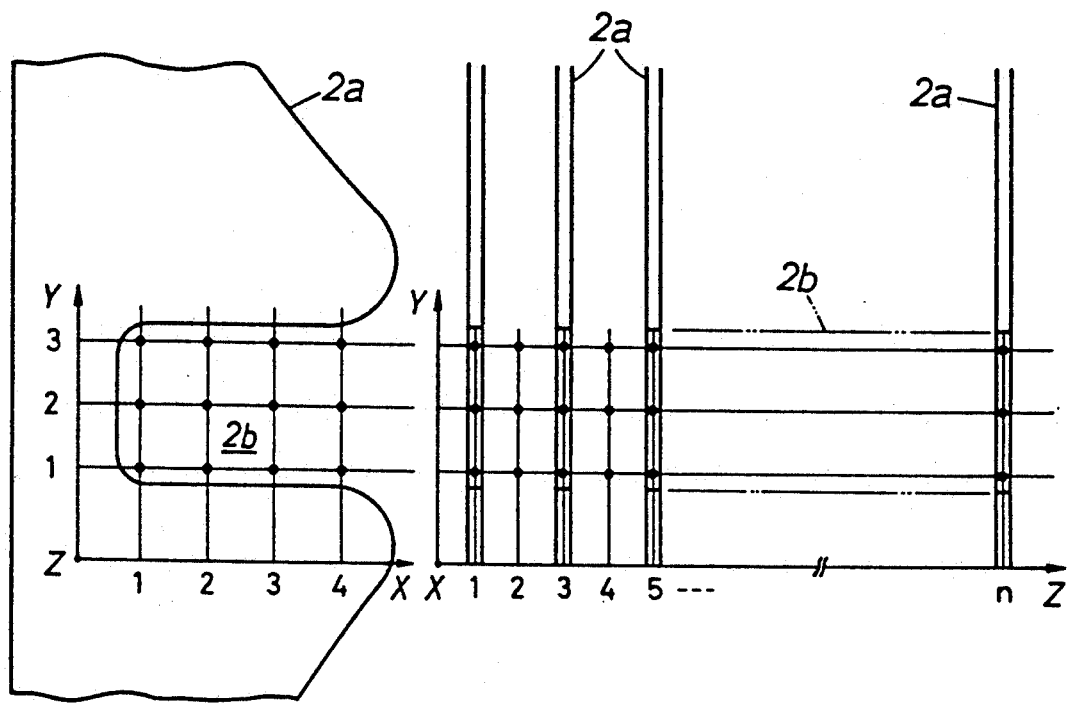
FIG. 4 is a diagram of assistance in explaining a coordinate system.

The measuring points P $(x_i, y_j, z_k)$ are disributed three-dimensionally in the reed groove 2b as shown in FIG. 4. The subscripts i and j are integers, for example, 1, 2, 3, and 4, and 1, 2 and 3, respectively, and the subscript k is composed of integers, for example, 1, 2, 3, ..., and n. Since the measuring points P on the Z-axis corresponds to the dents 2a and the middle positions between the adjacent dents 2a, namely, since the pitch of the measuring points P with respect to the Z-axis is half the pitch of the dents 2a of the modified reed 2, n is twice the number of dents 2a. In this embodiment, the number of the measuring points P is $4 \times 3 \times n$.

Upon the reception of the start command, the data processor 25 reads the data representing the measuring points P $(x_i, y_j, z_k)$, specifies the measuring points P $(x_i, y_j, z_k)$ sequent drives the feed controller 23 to locate the detecting head of the air-speed measuring instrument 8 sequentially at the measuring points P $(x_i, y_j, z_k)$. The sequence of the selection of the measuring points P $(x_i, y_j, z_k)$ is optional. For example, it is possible to specify a value for $z_k$ first to select an XY-plane, and to change the values for $x_i$ and $y_j$ sequentially in the XY-plane or to specify values for $x_i$ and $y_j$ first and then to change the value for $z_k$ sequentially.

Every time the air-speed measuring instrument 8 is located at each measuring point P $(x_i, y_j, z_k)$, the air-speed measuring instrument 8 measures the air-speed V. The air-speed measuring instrument 8 measures the air-speed indirectly by measuring the change of water level or an electrical signal. The air-speed measuring instrument 8 sends an air-speed signal representing an air-speed V to the signal converter 24. Then, the signal converter 24 converts the air-speed signal into air-speed data corresponding to the air-speed V and transfers the air-speed speed data to the data processor 25. In being moved within the reed groove 2b, the air-speed measuring instrument 8 is separated from the nozzle 7 by a fixed distance in a direction along the Z-axis.

Then, the data processor 25 stores the air-speed data measured at the measuring points P $(x_i, y_j, z_k)$ at predetermined storage locations, respectively, in the memory 28. A series of steps of locating the air-speed measuring instrument 8, measuring the air-speed, entering data and storing the air-speed data is repeated until the air-speed is measured at all of the measuring points P $(x_i, y_j, z_k)$.

After the completion of the air-speed measuring operation for all of the measuring points P $(x_i, y_j z_k)$, the data processor 25 specifies an XY-plane for each of the values of $z_k$, determines a maximum air-speed Va from among the air-speed data for the measuring points P included in the XY-plane, and stores the position (x, y) corresponding to the maximum air-speed Va at a predetermined storage location in the memory 28. If necessary, the position (x, y) corresponding to all of the maximum air-speeds Va stored in the memory 28 are displayed on the screen of the display 26 for the XZ-plane and the YZ-plane as shown in FIG. 5, or the positions (x, y) corresponding to all the maximum air-speeds Va are printed out by the printer 29.

Thus, the measuring points P corresponding to all of the maximum air-speeds Va are determined on a three-dimensional coordinate system defined by the X-axis, the Y-axis, and the Z-axis. If the modified reed 2 is constructed correctly, the coordinate defined by the X-axis and the Y-axis corresponding to the maximum air-speeds Va in the respective recesses of the dents 2a are substantially the same and a curve defined by connecting each measuring point representing the maximum air-speed $v_a$, i.e. an air-flow curve representing the maximum air-speeds Va varies periodically with respect to the Z-axis according to the intervals between the dents 2a. The air-flow curve varies irregularly in the vicinity of the recess of a defective dent 2a. So, the defective dent 2a can be found out from the irregular variation of the air-flow curve, and the cause of the defective dent 2a can be estimated from the coordinates of the irregular point P and if necessary from the maximum air-speed Va.

Figure 6:
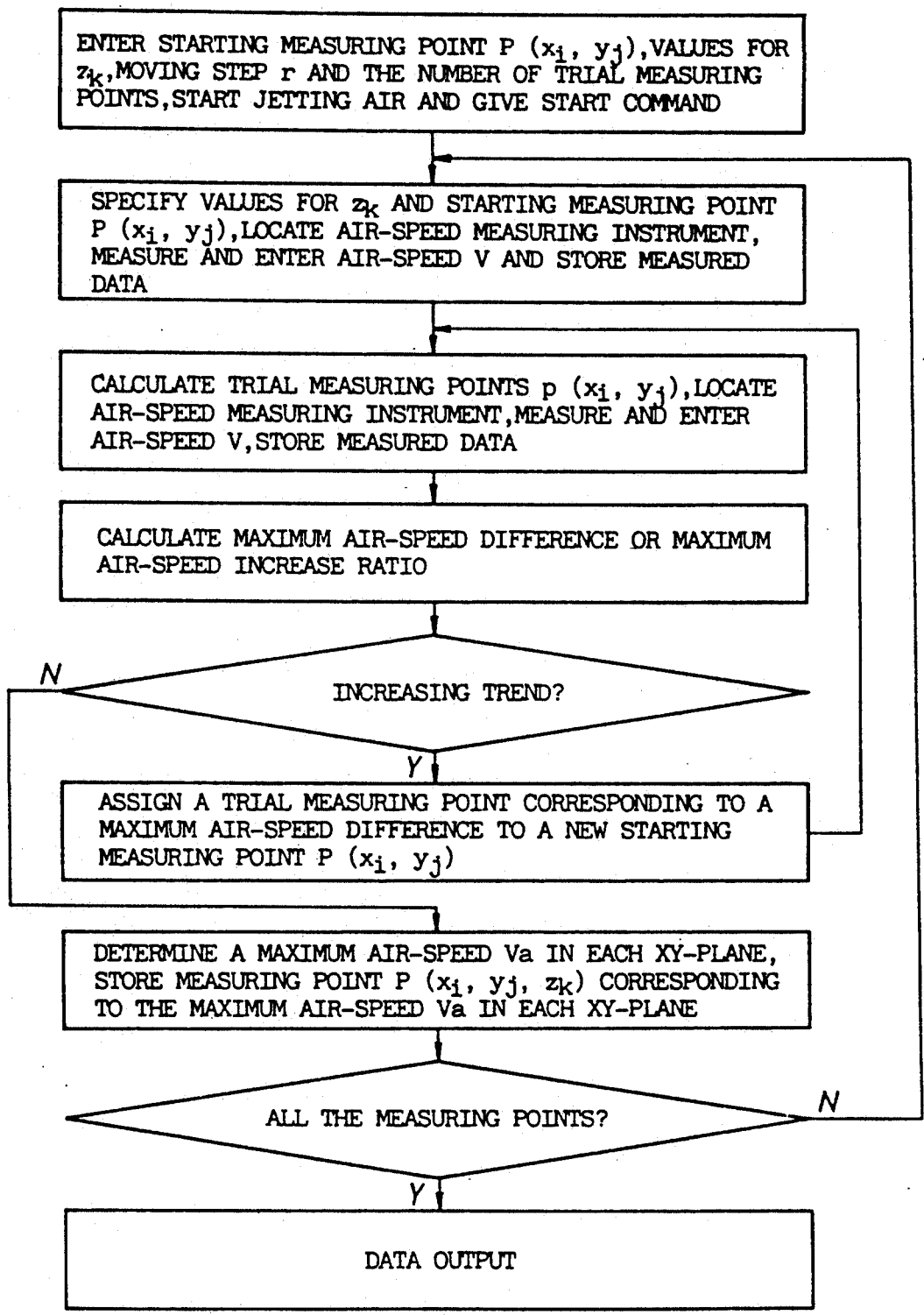
FIG. 6 is a flowchart of an air-speed measuring program to be executed by an air-speed measuring method in a second embodiment according to the present invention.
Figure 7:
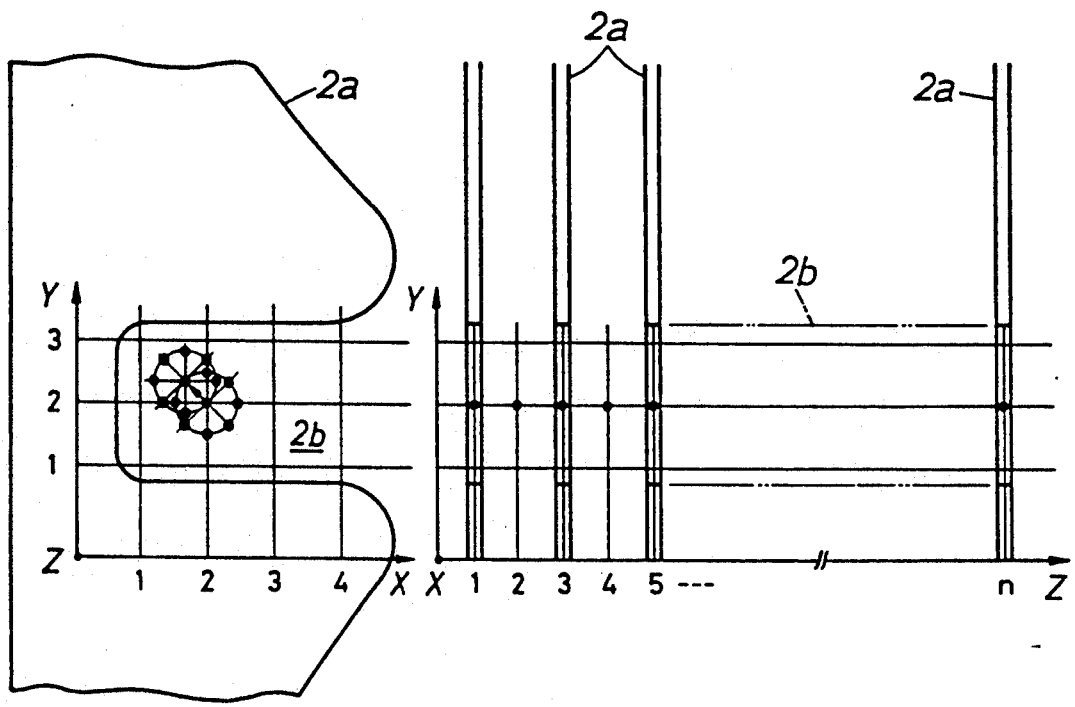
FIGS. 7A and B are a diagram of assistance in explaining a manner of displaying measured data.

An air-speed measuring method in a second embodiment according to the present invention will be described with reference to FIGS. 5, 6 and 7. This method specifies only a starting measuring point P on an XY-plane, shifts the measuring point P gradually on the XY-plane by a small distance at a time to estimate the trend of variation of air-speed V relative to the X and Y directions by a trial-and-error method, and finds a maximum wind-speed Va, namely, the maximal point on an air-speed variation curve.

First, the keyboard 27 is operated to enter a starting measuring point P $(x_i, y_j)$, for example, coordinates (2, 2), values for $z_k$, for example, 1, 2, ..., and n, for specifying XY-plane, a moving step r, and the number of trial measuring points p on the XY-plane, for example eight. The data entered by operating the keyboard 27 us stored in the memory 28. Then, compressed air is supplied to the nozzle 7. Subsequently, a start command is given to the data processor 25. The starting measuring point P (2, 2) is a point where a maximum air-speed Va is likely to appear.

The data processor 25 reads the first value for $z_k$, i.e., $z_k=1$, to specify an XY-plane, specifies the starting measuring point (2, 2) on the XY-plane, locates the air-speed measuring instrument 8 at the measuring point P (2, 2), measures air-speed V, and stores the measured air-speed.

In the subsequent step, the data processor 25 determines eight trial measuring points p $(x_i, y_j)$ on an arc of a circle with a radius r, for example, 1 mm, and with its center at the starting measuring point P (2, 2) by calculation, locates the air-speed measuring instrument 8 sequentially at the eight trial measuring points p $(x_i, y_j)$ to measure air-speed at each trial measuring point, and stores the measured values of air-speed in the memory 28. Then, the data processor 25 calculates (air-speed difference)=(air-speed at each trial measuring point p)−(air-speed at the starting measuring point P (2, 2)) or (air-speed increasing ratio (air-speed gradient))=−{(air-speed at each trial measuring point p)−(air-speed at the starting measuring point P (2, 2))}/(radius r). A trial measuring point p corresponding to a maximum air-speed difference or a maximum air-speed increasing ratio is selected as a new measuring point P $(x_i, y_j)$, and then the foregoing air-speed measuring procedure is repeated until the air-speed difference or the air-speed increasing ratio becomes negative. Thus, the maximum air-speed Va appears at a point between the last measuring point P and the measuring point p immediately before the last measuring point P. The data processor 25 selects a maximum air-speed Va among the measured values of air-speed obtained before the trend of measured values of air-speed changes from an increasing trend to a decreasing trend or, if necessary, a smaller value for the radius r is selected and the foregoing air-speed measuring procedure is repeated to determine a maximum air-speed Va. The maximum air-speed Va and the measuring point P $(x_i, y_j)$ corresponding to the maximum air-speed Va are stored in the memory 28.

The air-speed measuring operation of the data processor 25 is terminated upon the completion of a series of foregoing operations for the last XY-plane.

Figure 5:
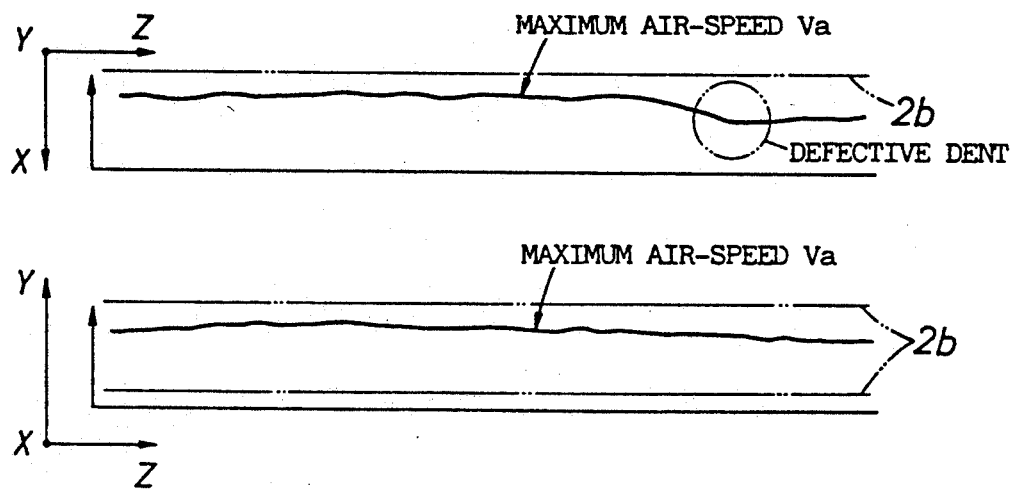
FIG. 5 is a diagram of assistance in explaining a manner of displaying measured data.

The measuring points corresponding to the maximum air-speeds Va on all of the XY-planes are read from the memory 28 and displayed as an air-flow curve for visual recognition on the display 26 in a three-dimensional manner, namely, by projections on both the XZ-plane and the XZ-plane, as shown in FIG. 5 or the coordinates of the measuring points P or the trial measuring points p and the corresponding maximum air-speeds Va are printed out by the printer 29.

Thus, an air-flow curve is obtained by plotting the maximum air-speeds Va sequentially in a direction along the Z-axis. The air-flow curve vaies irregularly in the vicinity of a position corresponding to a defective dent 2a. Thus, a defective dent 2a can be found out from the irregular variation of the air-flow curve, and defects in the recess of the defective dent 2a can be estimated from the directions or the degree of variation of the air-flow curve.

Figure 8:
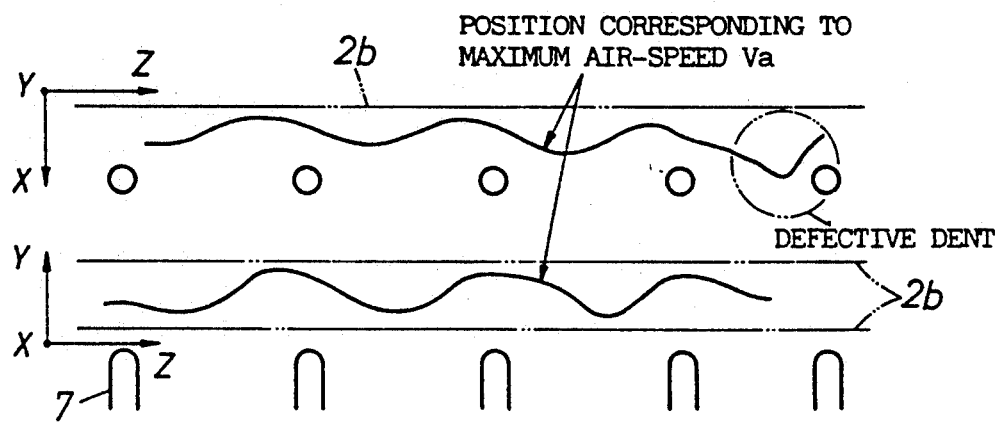

In the foregoing embodiments, the measuring point corresponding to the maximum air-speed Va is defined by three-dimensional coordinates. However, the measuring point may be defined by two-dimensional coordinates on the XZ-plane or the YZ-plane. Although the foregoing embodiments uses a single nozzle 7, a plurality of fixed nozzles arranged at predetermined intervals may be used or a test modified read 2 may be mounted on the slay of the loom and the auxiliary nozzles of the loom may be used. When a plurality of fixed nozzles 7 are used or the auxiliary nozzles of a loom are used, air-flow curves projected on the XZ-plane and the YZ-plane as shown in FIG. 8 are obtained. If the modified reed 2 is constructed correctly, the air-flow curve varies periodically. The air-flow curve is disturbed in the vicinity of a position corresponding to a defective dent 2a, so that the defective dent 2a can be found from the disturbance in the air-flow curve.

The position corresponding to the maximum air-speed need not necessarily be a point on a coordinate system, the same may be an area of a predetermined size including the position.

The positions corresponding to the maximum air-speeds may be displayed in a three-dimensional diagram instead of the two-dimensional diagrams as shown in FIGS. 5 and 8. The three-dimensional diagram further facilitates finding out defective dents.

What is claimed is:

1. A method of measuring air-speed in the reed groove of a modified reed comprising: jetting air into the reed groove of the modified reed in a manner equivalent to that in which air is jetted during weaving operation; measuring air-speed at a plurality of measuring point in each of a plurality of planes perpendicular to a longitudinal axis parallel to the longitudinal direction of the modified reed; determining a maximum air-speed among air-speeds at the measuring points in each plane, and providing position data representing the measuring points respectively corresponding to the maximum air speeds; wherein the measuring point is shifted by a small distance at a time to determine the trend of variation of air-speed, and a maximum air-speed is determined by finding out a point on an air-speed variation curve where the trend of variation of air-speed changes from an increasing trend to a decreasing trend.

2. A method of measuring air-speed in the reed groove of a modified reed according to claim 1, wherein the results of air-speed measurement are provided in an air-flow curve formed by plotting the maximum air-speeds at measuring points in the reed groove with respect to the longitudinal direction of the modified reed.

* * * * *